United States Patent [19]
Sasou et al.

[11] Patent Number: 5,661,289
[45] Date of Patent: Aug. 26, 1997

[54] CARD AND CARD CHECK METHOD

[75] Inventors: Hiroshi Sasou; Atsushi Yamazaki; Hiromi Chiba, all of Tokyo, Japan

[73] Assignee: Tamura Electric Works, Ltd., Japan

[21] Appl. No.: 619,176

[22] Filed: Mar. 21, 1996

[30] Foreign Application Priority Data

Mar. 28, 1995 [JP] Japan ................................. 7-069319

[51] Int. Cl.$^6$ ................................. G06K 7/08
[52] U.S. Cl. ................................. 235/449; 235/493
[58] Field of Search ................................. 235/449, 493

[56] References Cited

U.S. PATENT DOCUMENTS 5,421,463  6/1995  Okazaki et al. ................. 235/449 X

FOREIGN PATENT DOCUMENTS 6-75052  10/1994  Japan .

*Primary Examiner*—Harold Pitts
*Attorney, Agent, or Firm*—Samuels, Gauthier Stevens & Reppert

[57] ABSTRACT

A card includes a magnetic track portion, a first bar code area, and a second bar code area. Value information representing a prepaid amount and management information for card management are magnetically recorded in the magnetic track portion. The first bar code area is formed parallel to the magnetic track portion at a position not overlapping the magnetic track portion. The first bar code area is recorded with a first bar code representing the value information. The second bar code area is formed in a direction perpendicular to the first bar code area at a position not overlapping the first bar code area. The second bar code area is printed with a second bar code representing the management information. A method of checking this card is also disclosed.

15 Claims, 4 Drawing Sheets

CARD AND CARD CHECK METHOD

BACKGROUND OF THE INVENTION

The present invention relates to a which value information and a bar code are recorded, and a card check method of checking if this card is valid.

A bar code area in which a message count and amount at the time of card issuance, information representing the code of a pattern printed on the upper surface of a card, and the like are printed as a bar code is generally formed on the lower surface of a public telephone prepaid card on which prepaid value information is magnetically recorded.

FIG. 5A shows an example showing the lower surface of such a card. Reference numeral 1 denotes a card, 11a and 11b, magnetic tracks formed on the lower surface of the card 1 and magnetically recorded with value information and the like; and 12, a bar code area in which a bar code 12a representing a pattern code, an amount, and the like is printed.

At the time of a sales transaction using this card 1, the bar code 12a in the bar code area 12 is read with a scanner using an optical sensor and recorded as bar code data. The pattern codes and amounts of the cards are respectively totalized on the basis of the stored bar code data, and the sums are used as sales data of the card selling company.

The reflectance of the bar code 12a in the bar code area 12 is standardized in advance so as to properly read the bar code 12a of the bar code area 12 with a scanner. For this reason, prior to printing of the bar code 12a in the bar code area 12, a background area 13 including the bar code area 12 is printed in white, and then the bar code 12a is recorded.

In the conventional card 1 described above, however, when value information recorded in the magnetic tracks 11a and 11b is destroyed due to some cause, the value information first assigned to the card 1 cannot be identified. To solve this problem, the present applicant has made extensive studies such that each of unique serial numbers different in units of cards is recorded in the magnetic tracks 11a and 11b in addition to the value information, and this serial number is recorded as a second bar code in an area different from the bar code area 12.

FIG. 5B shows an example in which such a second bar code area 14 recorded with such a serial number as a second bar code 14a is formed on the same surface as that of the first bar code area 12 of the card 1. In this manner, the second bar code area 14 is additionally formed on the card 1, and the serial number represented by the bar code 14a in the second bar code area 14 is managed. When the value information in the magnetic tracks 11a and 11b of the card 1 is destroyed, the relationship between the serial number and the value information of the card can be easily grasped.

The first bar code 12a representing the pattern code and amount of the card 1 and the second bar code 14a representing the serial number are arranged adjacent to each other in the same read direction. For this reason, when a salesperson reads the bar code With a scanner in a direction indicated by a double-headed arrow, he or she cannot identify whether the first or second bar code 12a or 14a is read. If the bar code 14a of the bar code area 14 is read, and the read data is added to the card sales totalization data, wrong sales data is sent to the card selling company.

SUMMARY OF THE INVENTION

It is an object of the present invention to provide a card and a card check method in which the relationship between management information for managing a card and the value information of the card can be easily grasped.

It is another object of the present invention to provide a card and a card check method in which a card sales amount obtained upon reading the bar codes can be accurately totalized.

In order to achieve the above objects of the present invention, there is provided a card comprising a magnetic track portion on which value information representing a prepaid amount and management information for card management are magnetically recorded, a first bar code area formed parallel to the magnetic track portion at a position not overlapping the magnetic track portion, the first bar code area being recorded with a first bar code representing the value information, and a second bar code area formed in a direction perpendicular to the first bar code area at a position not overlapping the first bar code area, the second bar code area being printed with a second bar code representing the management information.

DESCRIPTION OF THE PREFERRED EMBODIMENT

The present invention will be described with reference to the accompanying drawings.

Figure 1:
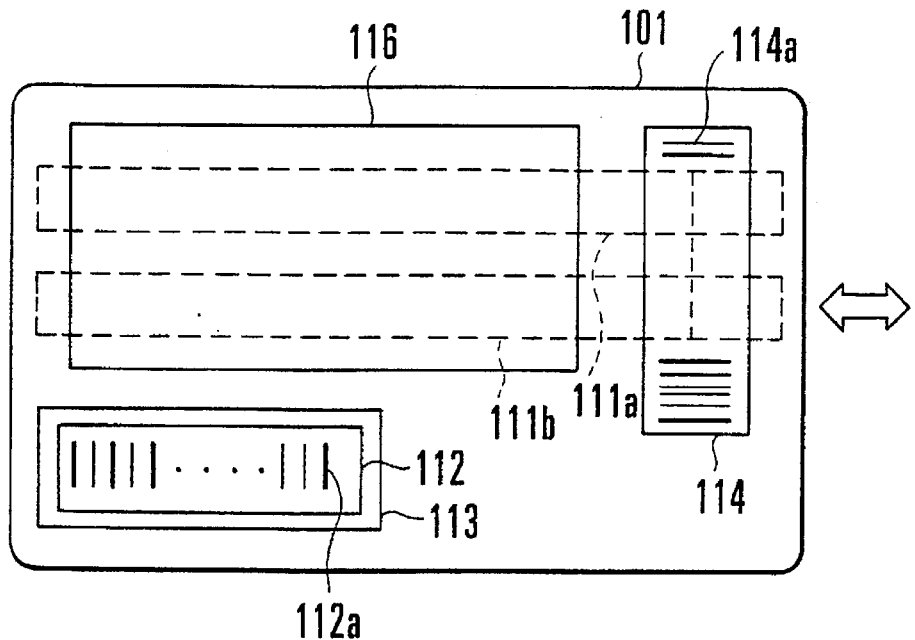
FIG. 1 is a plan view showing the lower surface of a card according to the present invention.

FIG. 1 shows the lower surface of a card according to an embodiment of the present invention. Reference numeral 101 denotes a card. The card 101 has magnetic tracks 111a and 111b on which the value information of the card is magnetically recorded, a first bar code area 112 on which a first bar code 112a representing amount information at the time of card issuance and pattern information on the upper surface is printed, and a second bar code area 114 in which a second bar code 114a representing the serial number is printed by an ink-jet scheme. In addition, a background printing area 113 printed in white so as to properly read the first bar code 112 with a scanner (not shown) is formed under the first bar code area 112.

The first bar code area 112 is formed on the lower surface of the card 101 and parallel to the magnetic tracks 111a and 111b. When the first bar code area 112 overlaps the magnetic tracks 111a and 111b, the background printing portion 113 is formed between the first bar code area 112 and the magnetic tracks 111a and 111b. The value information and the like cannot be read/write-accessed to the magnetic tracks 111a and 111b. For this reason, the first bar code area 112 is formed at a position parallel to the magnetic tracks 111a and 111b and different from the layout positions of the magnetic tracks 111a and 111b.

The first bar code 112a of the first bar code area 112 is scanned and read with a scanner by the salesperson every time a sales transaction using the card 101 is made. The read bar code data are totalized for card pattern information and for amount information, respectively, and the sum data are supplied as sales data to the card selling company.

On the other hand, background printing is not performed in the second bar code area 114 in which the second bar code 114a representing the serial number unique to the card is printed. The second bar code area 114 can overlap the magnetic tracks 111a and 111b. For this reason, the second bar code area 114 is located at a position overlapping the magnetic tracks 111a and 111b but not overlapping the first bar code area 112. The extending direction of the second bar code area 114 is perpendicular to that (read direction) of the magnetic tracks 111a and 111b and the first bar code area 112.

When the first and second bar code areas 112 and 114 are arranged at the predetermined positions, respectively, the salesperson can properly read the first bar code 112a of the first bar code area 112 in scanning the card from the left end to the right end in FIG. 1 to read the sales data.

The first bar code 112a of the first bar code area 112 is normally identical to those of other cards belonging to the same lot. The first bar code 112a is printed in units of lots. On the other hand, since the second bar code 114a representing the serial number unique to each card is recorded on the second bar code area 114, batch printing as in the first bar code 112a cannot be performed for the second bar code 114a. For this reason, after identical bar codes are simultaneously printed in the first bar code areas 112 of the respective cards belonging to the same lot, the second bar code 114a is printed in the second bar code area 114 of each card at the time of issuance by an ink-jet printer.

Note that reference numeral 116 denotes an area in which notes on use of the card 101 are printed. The double-headed arrow in FIG. 1 indicates the convey direction of the card 101 in the card issuing apparatus.

Figure 3:
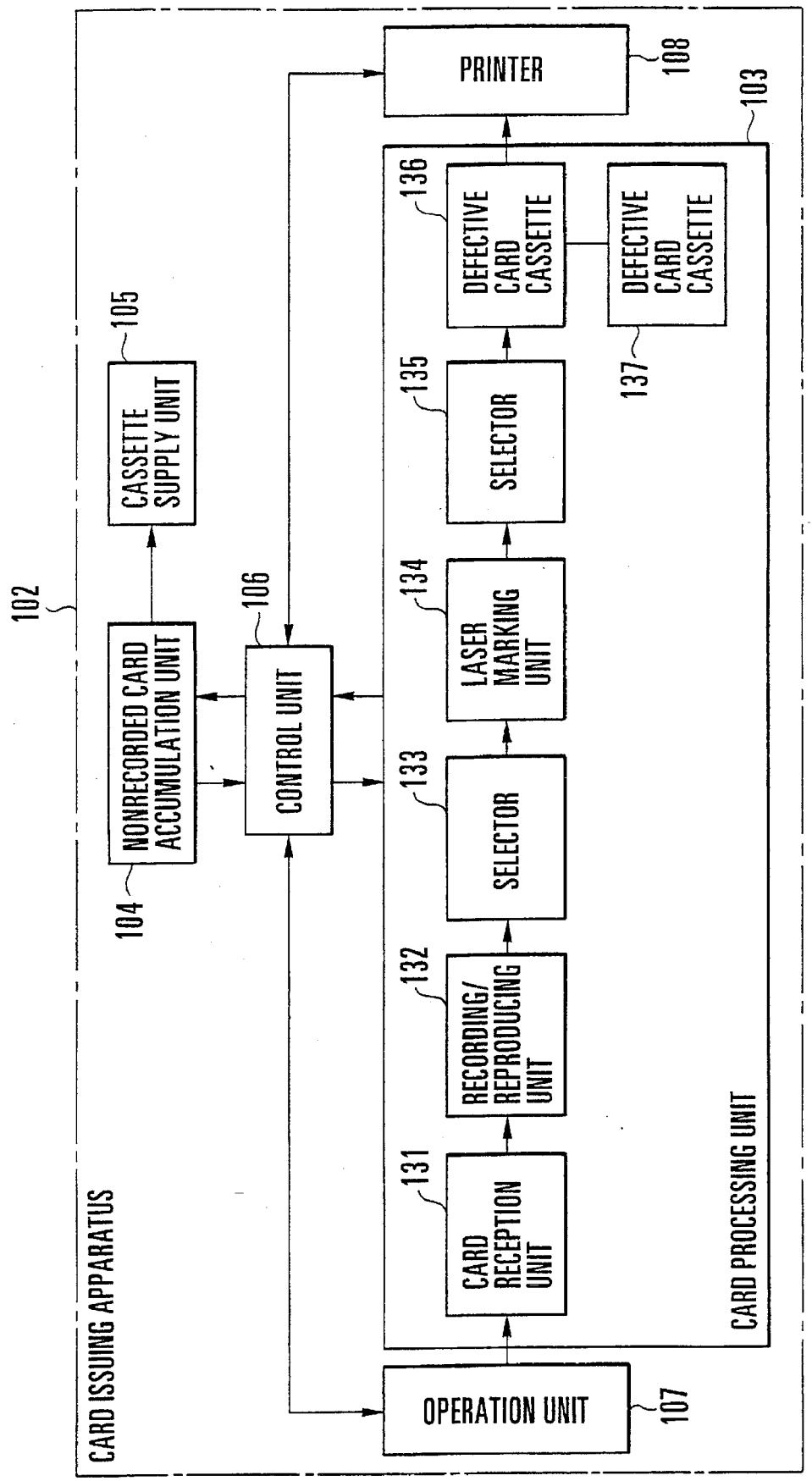
FIG. 3 is a block diagram showing the arrangement of a card issuing apparatus for issuing the card shown in FIG. 1.

FIG. 3 shows the arrangement of the card issuing apparatus for issuing the card 101 shown in FIG. 1. Referring to FIG. 3, reference numeral 102 denotes a card issuing apparatus. This card issuing apparatus 102 comprises a card processing unit 103 for processing the card 101, an operation unit 104 including a personal computer and the like, a control unit 106 for controlling the card processing unit 103 on the basis of information from the operation unit 104, a nonrecorded card accumulation unit 107 for accumulating nonrecorded cards preprinted with the first bar codes in the first bar code areas 112 to supply each nonrecorded card to the card processing unit 103, and a cassette supply unit 108 for keeping the cards issued by the card processing unit 103.

The card processing unit 103 comprises a card reception unit 131 for sequentially receiving nonrecorded cards 101 one by one, a first bar code reader 132 for reading the first bar code representing the value information and preprinted on the received card 101, a recording/reproducing unit 133 for recording, on the magnetic tracks 111a and 111b, card data consisting of the value information read by the first bar code reader 132 and the serial number unique to each card 101, and reproducing the recorded card data, a bar code recorder 134 for printing the second bar code 114a representing the serial number magnetically recorded on the magnetic tracks 111a and 111b in the second bar code area 114 in accordance with an ink-jet scheme, a bar code reader 135 for reading the recorded second bar code 114a, a selector 136 for sorting the cards 101 into a normal card and a defective card and supplying the normal card to the cassette supply unit 108 on the basis of the check result between written data and readout data, and a defective card cassette 137 for keeping the defective card sorted by the selector 136.

The control unit 106 determines whether the data written and read out by the recording/reproducing unit 133 coincide each other and whether the data written by the bar code recorder 134 coincides with the data read by the bar code reader 135. The control unit 106 controls the selector 136 to sort the cards 101 in accordance with the respective determination results. In addition, the control unit 106 increments the serial number by one every time the card 101 is normally issued and assigns the incremented serial number to the next card 101.

Figure 4:
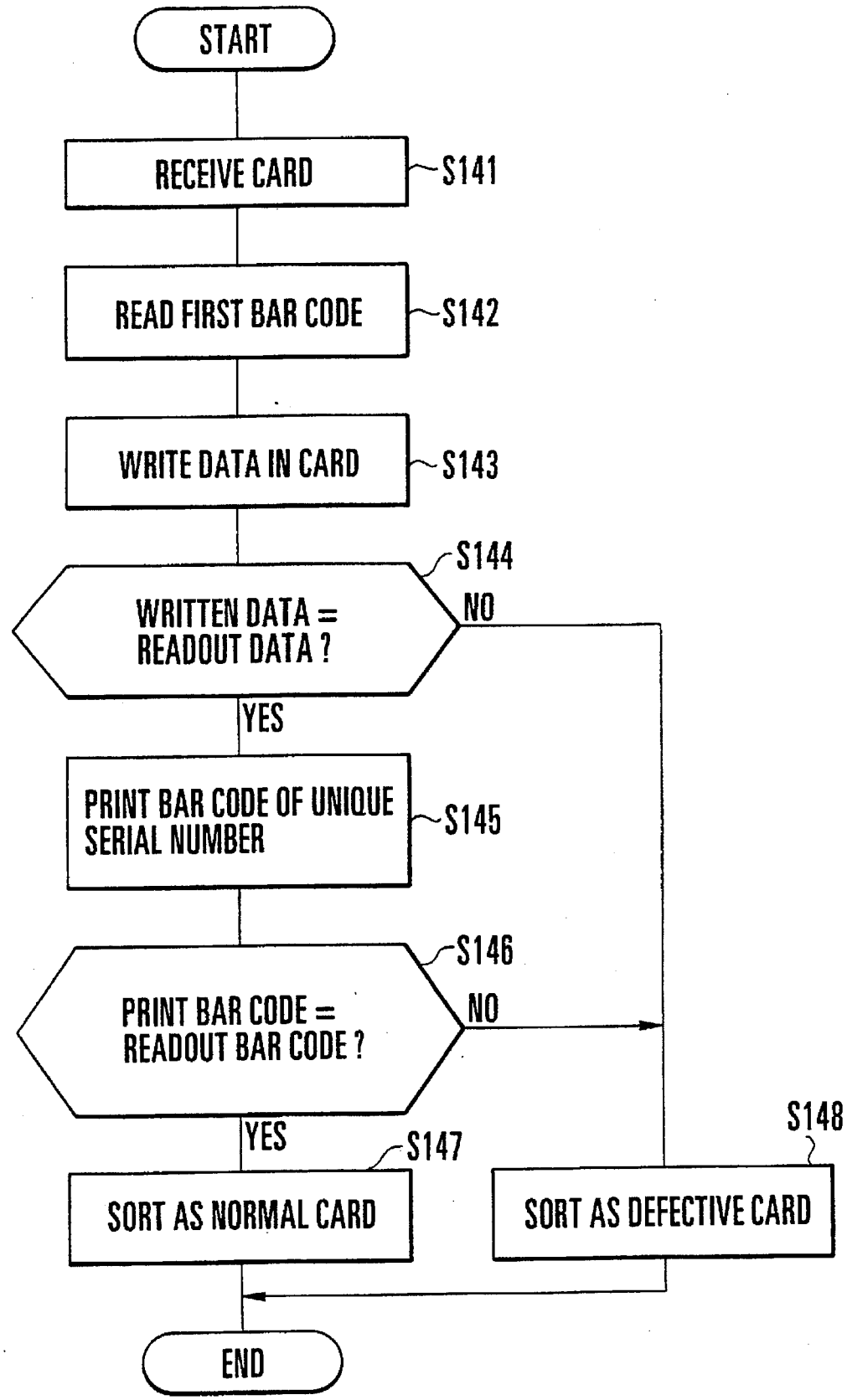
FIG. 4 is a flow chart showing a card issuing operation of the card issuing apparatus shown in FIG. 3.
Figure 5A:
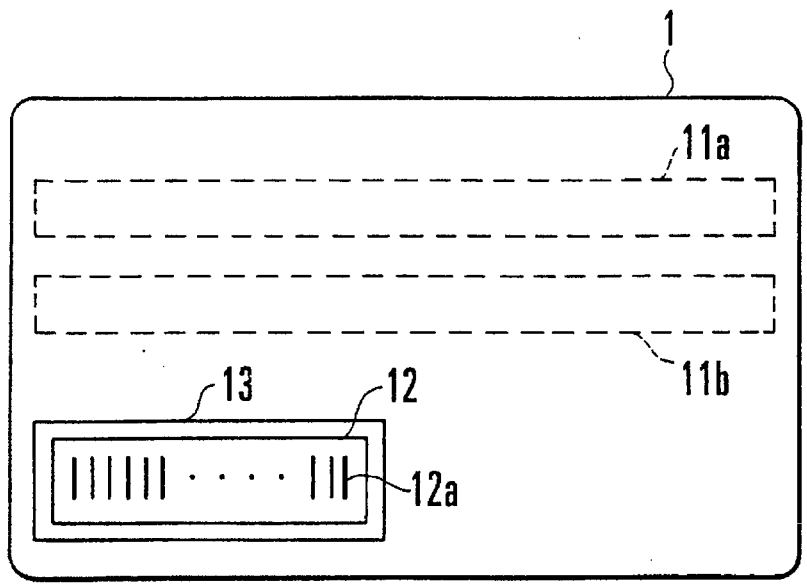
FIG. 5A is a plan view showing the lower surface of a conventional card.
Figure 5B:
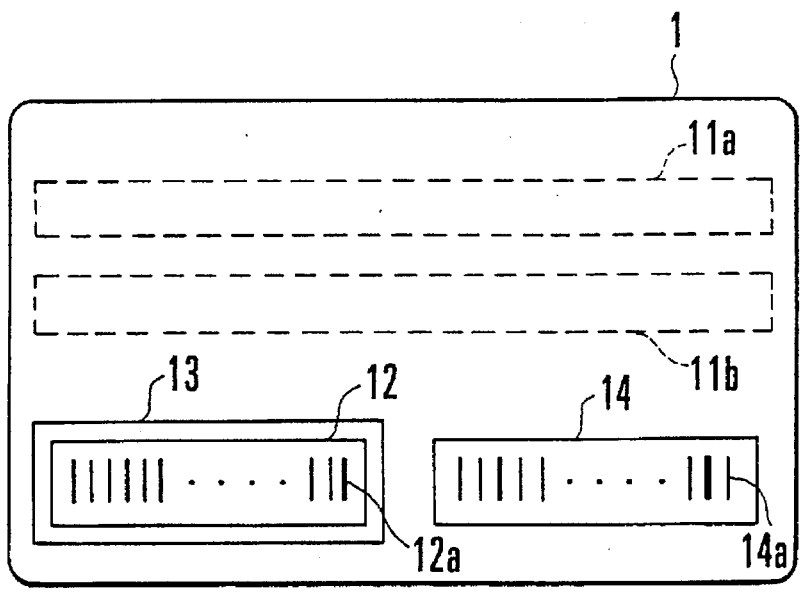
FIG. 5B is a plan view showing the lower surface of another conventional card which is improved from the card shown in FIG. 5A.
Figure 5B:

The card issuing operation of the card issuing apparatus 102 described above will be described with reference to FIG. 4.

The cards 101, i.e., nonrecorded cards manufactured by a card manufacturing company, each of which has the magnetic tracks 111a and 111b and the bar code area 112 in which the first bar code is printed, are accumulated in the nonrecorded card accumulation unit 107. When a card issuing instruction is supplied from the operation unit 104, the control unit 106 controls the card processing unit 103 to start card issuing processing. Subsequently, the card reception unit 131 receives the cards 101 from the nonrecorded card accumulation unit 107 one by one (step S141) and conveys each card to the position of the bar code reader 132 along a card convey path (not shown).

The bar code reader 132 reads the first bar code 112a preprinted in the first bar code area 112 (step S142), and the recording/reproducing unit 133 magnetically records the card data consisting of the value information and serial number represented by the first bar code 112a on the magnetic tracks 111a and 111b (step S143). The recording/reproducing unit 133 further reads out the recorded card data and outputs it to the control unit 106. The control unit 106 determines whether the serial number recorded by the recording/reproducing unit 133 coincides with the readout serial number (step S144). If YES in step S144, the second bar code 144a representing a serial number identical to that magnetically recorded on the second bar code area 114 is printed by the bar code recorder 134 in accordance with the ink-jet scheme (step S145).

The second bar code 114a recorded by the bar code reader 135 is read and output to the control unit 106. The control unit 106 determines whether the serial number recorded by the bar code recorder 134 coincides with the serial number read by the bar code reader 135 (step S146). If YES in step S146, the control unit 106 controls the selector 136 to sort the card 101 as a normal card to the cassette supply unit 108 (step S147). On the other hand, if the written data does not coincide with the readout data in steps S144 and S146, the control unit 106 sorts the card 101 as a defective card to the defective card cassette 137 (step S148).

The printer 105 prints issuance journal information such as the number of cards to be issued per lot, the date of issuance, the number of nondefective cards, and the number of defective cards.

In the above embodiment, card issuance using the card issuing apparatus 102 has been described above.

The use of the card 101 issued by the card issuing apparatus 102 in, e.g., a public telephone incorporating a card reader will be described below. When the card 101 is inserted into the public telephone, the serial number magnetically recorded on the magnetic tracks 111a and 111b and the second bar code 114a printed in the second bar code area 114 are read. It is then determined whether both the serial number data coincide with each other. If so, the use of the card 101 is controlled to be allowed.

Figure 2:
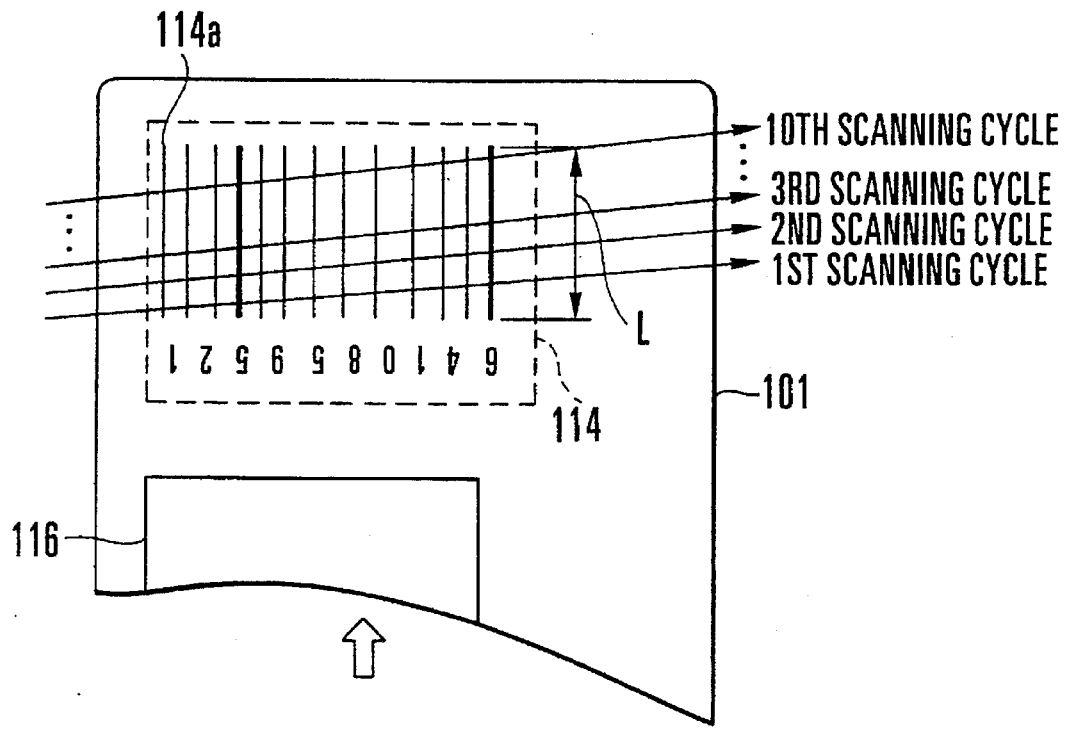
FIG. 2 is a view for explaining an operation for reading a second bar code shown in FIG. 1.

FIG. 2 shows an operation for reading the second bar code recorded on a card. The second bar code reader 135 comprising an optical sensor must scan the card in a direction perpendicular to the card convey direction to read the second bar code 114a printed on the card 101 conveyed in the card convey path at a predetermined speed. In this read method, a read error tends to occur to result in a large number of defective cards. For this reason, the second bar code 114a must be accurately read from the card 101 during conveyance.

Referring to FIG. 2, assume that the card 101 is conveyed in a direction indicated by an arrow, that the convey speed of the card 101 is given as 300 mm/sec, and that a length L of the second bar code 114a printed in the second bar code area 114 is given as 15 mm.

A time T required for causing the second bar code 114a to pass through the bar code reader 135 is given as follows:

$$T=15 \text{ (mm)}/300 \text{ (mm/sec)}=50 \text{ msec}$$

If the scanning speed of the second bar code reader 135 which scans the portion from the first bar code (left end in FIG. 2) to the last bar code (right end in FIG. 2) of the second bar code area 114 is given as 200 cycles/sec, the time of each scanning cycle is given as 5 msec.

As a result, the number N of scanning cycles of the second bar code reader 135 which scans the second bar code 114a printed in the second bar code area 114 of the card 101 conveyed at the above speed is given as:

$$N=50 \text{ msec}/5 \text{ msec}=10$$

That is, the second bar code reader 135 can scan the card by a maximum of 10 cycles.

When the bar length L of the second bar code 114a, i.e., the length in the card convey direction is increased, the maximum number N of scanning cycles of the second bar code reader 135 is increased, thereby improving data read reliability of the second bar code reader 135. In this case, when the second bar code reader 135 scans the bar code N times, and identical data can be read M times or more, the read data is confirmed. When M is closer to N, the read data precision can be improved.

As has been described above, according to the present invention, since the first bar code representing the value information can be easily discriminated from the second bar code representing the management information such as the serial number, the first bar code can be scanned with a scanner without any failure in a sales transaction using a card, thereby accurately totalizing the card sales data.

The second bar code is scanned a plurality of times in accordance with the length of the second bar code, the scanning speed of the scanner, and the card convey speed. Therefore, occurrence of a defective card can be prevented.

The management information representing magnetic recording and management information representing bar code printing are checked to determine whether the card is valid. Therefore, issuance of a defective card can be properly prevented.

Since pieces of identical information are recorded by means of both magnetic recording and bar code recording, the management information recorded on the card is read out in use of the card to determine whether the written information coincides with the readout information, thereby properly checking the validity of the card.

What is claimed is:

1. A card comprising:
    a magnetic track portion on which value information representing a prepaid amount and management information for card management are magnetically recorded;
    a first bar code area formed parallel to said magnetic track portion at a position not overlapping said magnetic track portion, said first bar code area being recorded with a first bar code representing the value information; and
    a second bar code area formed in a direction perpendicular to said first bar code area at a position not overlapping said first bar code area, said second bar code area being printed with a second bar code representing the management information.

2. A card according to claim 1, wherein the value information comprises at least one of pattern information representing a card pattern and amount information at the time of card issuance.

3. A card according to claim 1, wherein the management information comprises a serial number assigned to each card at the time of card issuance.

4. A card according to claim 1, wherein said second bar code area overlaps said magnetic track portion.

5. A card according to claim 1, wherein the second bar code is printed in said second bar code area such that a read direction of the second bar code is perpendicular to a card convey direction.

6. A card according to claim 1, wherein a length of the second bar code in said second bar code area is set in accordance with the number of scanning cycles of the second bar code, a scanning speed of a scanner for scanning the second bar code at a predetermined speed, and a card convey speed.

7. A check method comprising the steps of:
    reading a first bar code representing value information prerecorded in a first area of a card;
    magnetically recording the value information read from the first area and card management information in a second area of the card, the second area being formed parallel to the first area at a position not overlapping the first area;
    printing a second bar code representing the management information magnetically recorded in a third area of the card, the third area being formed in a direction perpendicular to the second area at a position not overlapping the second area;
    reading the second bar code printed in the third area;
    performing first determination to determine whether the second bar code printed in the third area coincides with the second bar code read from the third area; and
    sorting a card as a nondefective or defective card in accordance with a first determination result.

8. A method according to claim 7, further comprising the steps of:
    performing second determination to determine whether the management information recorded in the second area coincides with the management information read from the second area; and
    sorting a card as a nondefective or defective card in accordance with a second determination result.

9. A method according to claim 7, wherein the step of reading the second bar code comprises the steps of:

setting the number of scanning cycles of the second bar code in accordance with a length of the second bar code, a scanning speed of the second bar code, and a card convey speed; and scanning and reading the second bar code by a predetermined number of times to decide readout data.

10. A method according to claim 7, wherein the value information comprises at least one of pattern information representing a card pattern and amount information at the time of card issuance.

11. A method according to claim 7, wherein the management information comprises one of serial numbers consecutively assigned to cards at the time of card issuance.

12. A method according to claim 7, wherein the third area overlaps the second area.

13. A method according to claim 7, wherein the second bar code is printed in the third area such that a read direction of the second bar code is perpendicular to a card convey direction.

14. A method according to claim 7, wherein the second area comprises a magnetic track portion formed in a predetermined area of the card, and the third area comprises a bar code printing portion printed in accordance with an ink-jet scheme.

15. A method according to claim 7, further comprising the steps of:

performing third determination to determine whether the management information read from the second area coincides with the management information read from the third area; and deciding in accordance with a third determination result whether use of the card is allowed.

* * * * *